(12) United States Patent
Macaluso

(10) Patent No.: US 12,218,386 B1
(45) Date of Patent: Feb. 4, 2025

(54) FIRE SUPPRESSION FOR ENERGY STORAGE DEVICES

(71) Applicant: Anthony Macaluso, San Diego, CA (US)

(72) Inventor: Anthony Macaluso, San Diego, CA (US)

( * ) Notice: Subject to any disclaimer, the term of this patent is extended or adjusted under 35 U.S.C. 154(b) by 0 days.

(21) Appl. No.: 18/443,141

(22) Filed: Feb. 15, 2024

(51) Int. Cl.
*H01M 50/609* (2021.01)
*H01M 50/224* (2021.01)
*H01M 50/233* (2021.01)
*H01M 50/249* (2021.01)
*H01M 50/271* (2021.01)

(52) U.S. Cl.
CPC ....... *H01M 50/609* (2021.01); *H01M 50/224* (2021.01); *H01M 50/233* (2021.01); *H01M 50/249* (2021.01); *H01M 50/271* (2021.01); *H01M 2200/10* (2013.01)

(58) Field of Classification Search
None
See application file for complete search history.

(56) References Cited

FOREIGN PATENT DOCUMENTS

| CN | 212700167 | | 3/2021 | | |
|---|---|---|---|---|---|
| CN | 115699428 A | * | 2/2023 | ............... | A62C 3/07 |
| WO | WO-2017065496 A1 | * | 4/2017 | .......... | H01M 2/0237 |

OTHER PUBLICATIONS

Machine Translation of CN-115699428-A (Year: 2023).*
Machine Translation of WO-2017065496-A1 (Year: 2017).*

* cited by examiner

*Primary Examiner* — Gregg Cantelmo
(74) *Attorney, Agent, or Firm* — Knobbe, Martens, Olson & Bear, LLP

(57) ABSTRACT

An energy storage device container can suppress fires and can comprise a compartment configured to receive an energy storage device and a chamber configured to hold a fire suppressive agent, the chamber being positioned above the compartment. A barrier can be positioned between the compartment and the chamber and can physically separate the fire suppressive agent from the energy storage device to inhibit the fire suppressive agent from entering the compartment when the barrier is in a first physical state. The barrier can change from the first physical state to a second physical state in response to thermal energy having a threshold temperature to allow the fire suppressive agent to enter the compartment to contact the energy storage device.

23 Claims, 3 Drawing Sheets

FIRE SUPPRESSION FOR ENERGY STORAGE DEVICES

FIELD OF THE DISCLOSURE

The present disclosure relates to systems, devices, and methods for suppressing fires in energy storage devices.

BACKGROUND

Electric vehicles derive locomotion power from electricity often received from an energy storage device within the electric vehicle. The energy storage device could be a battery, a battery array, or an energy storage and/or containment device. Batteries, including, lithium-ion batteries, can ignite into fires especially when improperly manufactured or used. Fires resulting from batteries are dangerous, particularly in vehicles, and can lead to serious injury or even death.

SUMMARY

Various implementations of systems, methods and devices within the scope of the appended claims each have several aspects, no single one of which is solely responsible for the desirable attributes described herein. Without limiting the scope of the appended claims, the description below describes some prominent features.

Details of one or more implementations of the subject matter described in this specification are set forth in the accompanying drawings and the description below. Other features, aspects, and advantages will become apparent from the description, the drawings, and the claims. Note that relative dimensions of the following figures may not be drawn to scale.

An energy storage device container can hold an energy storage device such as a battery and/or capacitor in a bottom portion and can hold a fire suppressive material in a top portion positioned above the energy storage device. The top portion can be separated by the bottom portion by a barrier configured to burn and disintegrate such that if a fire from the energy storage device burns the barrier away, the fire suppressive material drops from the top portion down onto the energy storage device below and suppresses the fire.

An energy storage device container can facilitate fire suppression. The energy storage device container can comprise: a compartment comprising a compartment material, the compartment being configured to receive an energy storage device; a chamber configured to hold a fire suppressive agent, the chamber being positioned above the compartment; and a barrier comprising a barrier material, the barrier being disposed between the compartment and the chamber and configured to physically separate the chamber from the compartment to inhibit the fire suppressive agent from entering the compartment when the barrier is in a first physical state, wherein the barrier is configured to change from the first physical state to a second physical state in response to thermal energy having a threshold temperature to allow the fire suppressive agent to enter the compartment to contact the energy storage device, wherein a melting temperature of the barrier material is less than a melting temperature of compartment material, wherein the threshold temperature is less than the melting temperature of the compartment material.

In some implementations, an ignition temperature of the barrier material is less than the melting temperature of the compartment material.

In some implementations, an ignition temperature of the barrier material is less than an ignition temperature of the compartment material.

In some implementations, the melting temperature of the barrier material is less than an ignition temperature of the compartment material.

In some implementations, the melting temperature of the barrier material is less than an ignition temperature of the barrier material.

In some implementations, the barrier has a thickness of less than 2 inches.

In some implementations, the barrier comprises a plurality of materials.

In some implementations, the chamber is pressurized relative to the compartment when the barrier is in the first physical state.

In some implementations, the chamber is not pressurized relative to the compartment when the barrier is in the first physical state, wherein the fire suppressive material enters the compartment in response to gravity when the barrier is in the second physical state.

In some implementations, the barrier is separated from the energy storage device by a distance.

In some implementations, the compartment material comprises aluminum or an aluminum alloy.

In some implementations, the energy storage device container is implemented in an electric vehicle.

An energy storage device container for suppressing fires can comprise: a compartment comprising a compartment material, the compartment being configured to receive an energy storage device; a chamber configured to hold a fire suppressive agent, the chamber being positioned above the compartment; and a barrier comprising a barrier material, the barrier being disposed between the compartment and the chamber and configured to physically separate the chamber from the compartment to inhibit the fire suppressive agent from entering the compartment when the barrier is in a first physical state, wherein the barrier is configured to change from the first physical state to a second physical state in response to thermal energy having a threshold temperature to allow the fire suppressive agent to enter the compartment to contact the energy storage device, wherein an ignition temperature of the barrier material is less than an ignition temperature of compartment material, wherein the threshold temperature is less than the ignition temperature of the compartment material.

In some implementations, the ignition temperature of the barrier material is less than a melting temperature of the compartment material.

In some implementations, a melting temperature of the barrier material is less than a melting temperature of the compartment material and is less than the ignition temperature of the compartment material.

In some implementations, a melting temperature of the barrier material is less than the ignition temperature of the barrier material.

In some implementations, a pressure within the chamber is substantially similar to a pressure within the compartment when the barrier is in the first physical state.

In some implementations, the barrier is separated from the energy storage device by a distance.

A container for holding an energy storage device can comprise: a compartment configured to receive an energy storage device; a chamber configured to hold a fire suppressive agent, the chamber being positioned above the compartment; and a barrier disposed between the compartment and the chamber, the barrier being configured to physically separate the chamber from the compartment to inhibit the fire suppressive agent from entering the compartment, wherein a structure of the barrier is configured to change responsive to thermal energy to allow the fire suppressive agent to enter the compartment, wherein a structure of the compartment is more resistant to change, responsive to the thermal energy, than the structure of the barrier.

In some implementations, the barrier is configured to ignite responsive to the thermal energy before the compartment.

In some implementations, the barrier is configured to melt responsive to the thermal energy before the compartment.

In some implementations, the barrier is configured to melt before igniting.

In some implementations, the barrier is separated from the energy storage device by a distance.

Various combinations of the above and below recited features, embodiments, implementations, and aspects are also disclosed and contemplated by the present disclosure.

Additional implementations of the disclosure are described below in reference to the appended claims, which may serve as an additional summary of the disclosure.

BRIEF DESCRIPTION OF THE DRAWINGS

The following drawings and the associated descriptions are provided to illustrate implementations of the present disclosure and do not limit the scope of the claims. Aspects and many of the attendant advantages of this disclosure will become more readily appreciated as the same become better understood by reference to the following detailed description, when taken in conjunction with the accompanying drawings.

DETAILED DESCRIPTION

Although certain implementations, embodiments, and examples are disclosed below, the inventive subject matter extends beyond the specifically disclosed implementations to other alternative implementations and/or uses and to modifications and equivalents thereof. Thus, the scope of the claims appended hereto is not limited by any of the particular implementations described below. For example, in any method or process disclosed herein, the acts or operations of the method or process may be performed in any suitable sequence and are not necessarily limited to any particular disclosed sequence. Various operations may be described as multiple discrete operations in turn, in a manner that may be helpful in understanding certain implementations; however, the order of description should not be construed to imply that these operations are order dependent. Additionally, the structures, systems, and/or devices described herein may be embodied as integrated components or as separate components. For purposes of comparing various implementations, certain aspects and advantages of these implementations are described. Not necessarily all such aspects or advantages are achieved by any particular implementation. Thus, for example, various implementations may be carried out in a manner that achieves or optimizes one advantage or group of advantages as taught herein without necessarily achieving other aspects or advantages as may also be taught or suggested herein.

Figure 1:
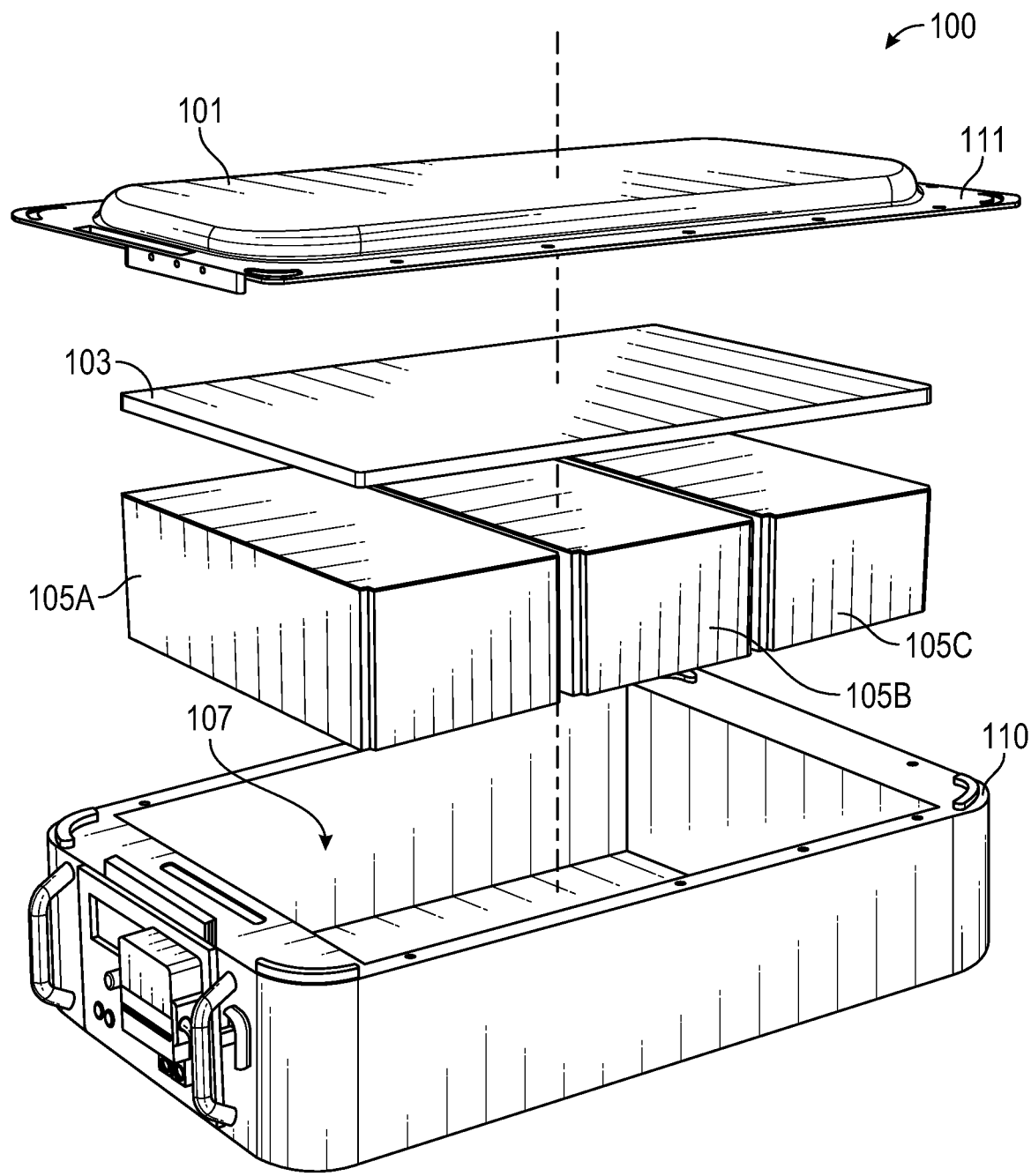
FIG. 1 is an exploded view of an energy storage device container.

FIG. 1 is a perspective exploded view of an example energy storage device container 100 which may also be referred to herein as container 100. Container 100 can include a top portion 111, a chamber 101, a barrier 103, a main body 110, and a compartment 107.

The compartment 107 can be disposed within the main body 110. The compartment can hold one or more energy storage devices 105 (for example, 105A-105C). The compartment 107 can at least partially enclose the energy storage devices 105. The energy storage devices 105 can include one or more batteries (such as lithium-based batteries including lithium-ion batteries) and/or capacitors (such as ultracapacitors or supercapacitors). The energy storage devices 105 can be rechargeable.

The top portion 111 can be removable from the main body 110. The top portion 111 can include a chamber 101. The chamber 101 can hold one or more fire suppressive agents. The chamber 101 may be positioned above the compartment 107 (for example, above the energy storage devices 105) when the top portion 111 is secured to the main body 110 and/or when the energy storage device container 100 is installed in an electronic device such as an electric vehicle.

The barrier 103 can be positioned between the compartment 107 and the chamber 101. The barrier 103 may physically separate the compartment 107 from the chamber 101. For example, the barrier 103 may form an airtight seal between the compartment 107 and the chamber 101 such that the chamber 101 and compartment 107 are sealed off from one another. The barrier 103 can inhibit the contents of the chamber (for example, fire suppressive agents) from entering the compartment 107 and/or from contacting the energy storage devices 105. At least a portion of the barrier 103 may be formed of a metal or metal alloy. The barrier 103 may assume a first physical state under normal conditions. For example, at ordinary pressures and/or temperatures, the barrier 103 may be a solid. The barrier 103 may change from the first physical state to a second physical state in response to changing conditions. For example, the barrier 103 may melt from a solid to a liquid at higher pressures or temperatures. As another example, the barrier 103 may ignite at higher pressures or temperatures such that the barrier 103 burns or is consumed or damaged by thermal energy (for example, resulting from fire). In some implementations, the energy storage device 105 can ignite and burn and release thermal energy which can cause the barrier 103 to transition from a first physical state to a second physical state such as by melting or burning. When in the second physical state, the barrier 103 may not separate the chamber 101 from the compartment 107 and/or may allow the contents of the chamber 101 to enter the compartment 107. For example, a fire from the energy storage devices 105 may cause the barrier 103 to change physical states (for example, melt or burn) which may disrupt a physical seal between the chamber 101 and the compartment 107 such that fire suppressive agents in the chamber 101 are allowed to enter the compartment 107 to contact the energy storage device 105 which can inhibit or suppress the fire.

The barrier 103 may be formed of a different material than other components of the container 100, such as the main body 110 or the top portion 111. The barrier 103 can have different physical properties than other components of the container 100, such as the main body 110 or the top portion 111. The barrier 103 (or material(s) of the barrier 103) can have a lower melting temperature than the main body 110

(including the compartment 107) and/or top portion 111 (or materials thereof). As a result, the barrier 103 may melt before the main body 110 in the case of a fire (for example, from the energy storage devices 105) that causes thermal energy that is higher than ordinary. When the barrier 103 melts, fire suppressive agents stored in the chamber 101 may be released into the compartment 107 to suppress the fire before the container 100 (for example, main body 110) changes form (for example, melts or burns). As another example, the barrier 103 can have a lower ignition temperature than the main body 110 (including the compartment 107) and/or top portion 111 such that the barrier 103 ignites and burns before the container 100 (for example, main body 110). As another example, the barrier 103 can have a melting temperature that is lower than an ignition temperature of the main body 110 (including the compartment 107) and/or top portion 111 such that the barrier 103 melts to release fire suppressive agents before the container 100 (for example, main body 110) ignites. As another example, the barrier 103 can have an ignition temperature that is lower than a melting temperature of the main body 110 (including the compartment 107) and/or top portion 111 such that the barrier 103 ignites and burns away to release fire suppressive agents before the container 100 (for example, main body 110) melts.

In some implementations, the barrier 103 can have a lower melting temperature than an ignition temperature such that the barrier 103 melts before igniting, burning, or releasing additional thermal energy. Accordingly, the barrier 103 may change physical states (for example, melt) without releasing additional thermal energy which would possibly further induce the main body 110 to change form.

The main body 110 (including the compartment 107) can comprise aluminum or an aluminum alloy. Aluminum can have a melting temperature of about 1220° F. Aluminum can have an ignition temperature of about 1030° F. The barrier 103 can comprise one or more metals or metal alloys including one or more of selenium, tin, babbitt, bismuth, cadmium, lead, magnesium, zinc, or aluminum. The barrier 103, or portions thereof, can be more responsive to thermal energy (for example, more likely to change structure such as by melting or burning) than the main body 110 (including the compartment 107). As described herein, a melting temperature may refer to the lowest temperature at which a given substance or material changes from a solid state to a liquid state. As described herein, an ignition temperature may refer to the lowest temperature at which a given substance or material combusts (for example, begins to be consumed by fire).

The barrier 103 may be formed of a plurality of materials each with different properties (for example, melting temperatures or ignition temperatures). For example, the barrier 103 may have one or more portions such as circles, strips, lines, etc. that are formed of a different material than other portions of the barrier 103 and which may be more responsive to thermal energy, such as having a lower melting temperature or ignition temperature than the other portions of the barrier 103. As an example, portions of the barrier 103 may melt or burn away responsive to thermal energy leaving a plurality of through-holes in the barrier 103 while other portions of the barrier 103 may not melt or burn away responsive to the thermal energy.

The barrier 103 can have thickness (for example, between the compartment 107 and the chamber 101) of less than 3 inches, less than 2.5 inches, less than 2 inches, less than 1.5 inches, less than 1.25 inches, less than 1 inch, less than 0.75 inches, less than 0.5 inches, less than 0.25 inches, or the like. In some implementations, the barrier 103 can be 1.5 inches thick.

As described herein, a fire suppressive agent may refer to any substance used to inhibit or suppress a fire. A fire suppressive agent may also be referred to as a fire retardant. Fire suppressive agents may include solids, liquids, gases, or powders (for example, particulates). Fire suppressive agents can include carbon dioxide-based agents which can be discharged onto a fire in the form of a gas or snow cloud. Carbon dioxide-based agents may not leave a residue when discharged onto surfaces which may be an advantage for protecting electronic equipment.

Fire suppressive agents can include halogenated agents such as halon or halon alternative agents. Halogenated agents can include bromochlorodifluoromethane (halon 1211). Fire suppressive agents can include dry chemical agents including sodium bicarbonate-based agents, potassium bicarbonate-based agents, ammonium phosphate-based agents. Fire suppressive agents can include dry power agents.

Fire suppressive agents can include film-forming foam agents including AFFF (aqueous film-forming foam) and FFFP (film-forming fluoroprotein). Fire suppressive agents can include water-based agents. Fire suppressive agents can include wet chemical agents including solutions of water, potassium acetate, potassium carbonate, potassium citrate, or a combination thereof (which are conductors of electricity). A wet chemical agent can have a pH of 9.0 or less. Fire suppressive agents can include additives such as antifreeze to prevent freezing or other additives to prevent packing or moisture absorption (caking).

Figure 2:
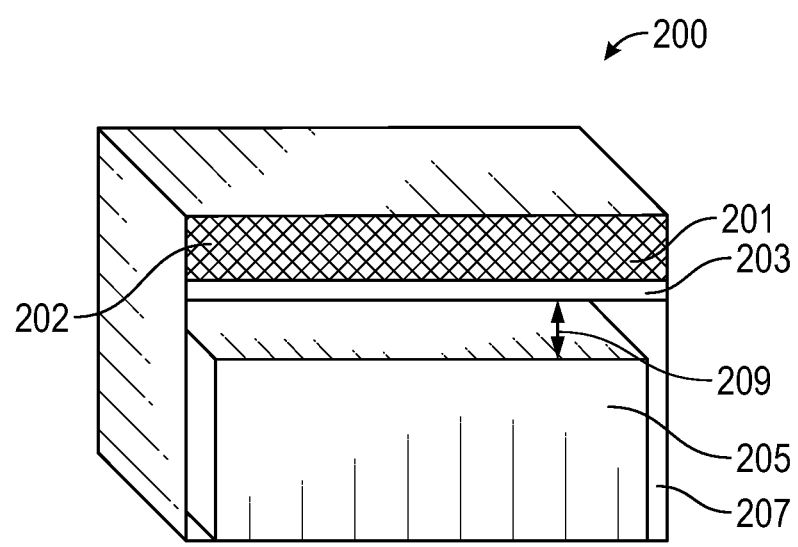
FIG. 2 is a perspective cutaway view of an example energy storage device container.

FIG. 2 is a perspective cutaway view of an example energy storage device container 200 which can include similar structural and/or operational features of any of the other example energy storage device containers shown and/or described herein. The container 200 can include a chamber 201, a barrier 203, and a compartment 207. The compartment 207 may house an energy storage device 205 such as a battery or capacitor. The chamber 201 may hold a fire suppressive agent 202.

The chamber 201 may be positioned above the energy storage device 205. The barrier 203 can separate the chamber 201 from the compartment 207 which might be with an airtight seal. The barrier 203 can contain the fire suppressive agent 202 within the chamber 201 to inhibit the fire suppressive agent 202 from entering the compartment 207 and/or contacting the energy storage device 205. The barrier 203 may change physical form such as from one physical state to another physical state. For example, the barrier 203 may exist in a first physical state (for example, as a solid) to separate the fire suppressive agent 202 from the compartment 207 and may change to a second physical state (for example, burns or melts) responsive to thermal energy (for example, from a fire from the energy storage device 205). When the barrier 203 changes physical states, the fire suppressive agent 202 may enter the compartment 207 and/or contact the energy storage device 205. For example, the barrier 203 may be consumed in a fire (for example, disintegrated, damaged, melted, incinerated, etc.) and the fire suppressive agent may fall down into the compartment 207 as a result of gravitational force.

In some implementations, the chamber 201 may be pressurized when the barrier 203 seals the fire suppressive agent 202 from the compartment 207. Accordingly, when the barrier 203 changes physical states, the fire suppressive agent 202 may exit the chamber 201 with force caused by pressure differences between the chamber 201 and the compartment 207 which may advantageously induce a greater quantity of the fire suppressive agent 202 to contact a greater portion of the energy storage device 205. In some implementations, the chamber 201 may not be pressurized. For example, when the barrier 203 changes physical states, the fire suppressive agent 202 may exit the chamber due to gravitational force and may fall on the energy storage device 205. Advantageously, a non-pressurized chamber may be easy, faster, and/or cheaper to manufacture than a pressurized chamber.

The energy storage device 205 may be separated from the barrier 203 by a distance 209. The distance 209 may be greater than a thickness of the barrier 203. In some implementations, the distance 209 may be equal to or less than a thickness of the barrier 203. In some implementations, the distance 209 may be less than 6 inches, less than 5 inches, less than 4 inches, less than 3 inches, less than 2 inches, or less than 1 inch. When the barrier 203 changes physical states (for example, burns as a result of thermal energy), the fire suppressive agent 202 may travel from the chamber 201 across the distance 209 to contact a top surface of the energy storage device 205. Advantageously, as the fire suppressive agent 202 travels across the distance 209 the fire suppressive agent 202 may dissipate or spread out which may result in the fire suppressive agent 202 covering a greater portion of the energy storage device 205 resulting in greater fire suppression. Moreover, because the fire suppressive agent 202 travels across the distance 209 after it exits the chamber 201, the fire suppressive agent 202 may not block itself from exiting the chamber 201 and accordingly a greater amount of fire suppressive agent 202 may be allowed to exit the chamber 201 resulting in greater fire suppression. In some implementations, the distance 209 may be zero.

Figure 3:
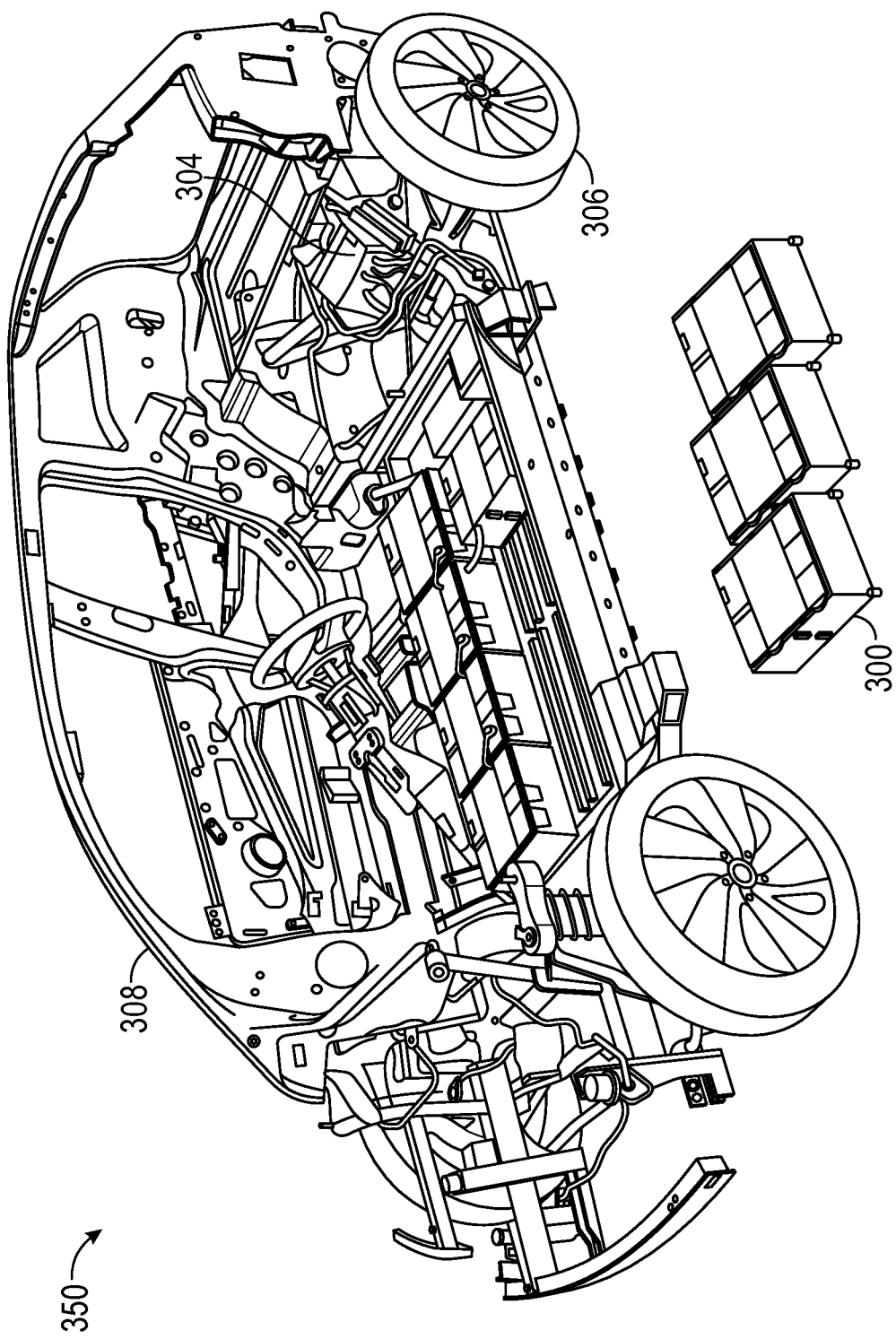
FIG. 3 illustrates an example implementation of an energy storage device container in a vehicle.

FIG. 3 illustrates an energy storage device container 300 implemented in a vehicle 350 such as a battery electric vehicle (BEV). The vehicle 350 includes, among other components shown, one or more energy storage device containers 300, at least one electric motor 304, a plurality of wheels 306, and a frame or body 308. The energy storage device container 300 can include any of the structural and/or operational features of any of the other example energy storage device containers shown and/or described herein. The energy storage device container 300 may include a plurality of individual battery or capacitor units, or combinations thereof, and may store energy used to drive the at least one electric motor 304. In some embodiments, the individual battery units may be coupled in series to provide a greater voltage for the energy storage device container 300 than an individual battery unit. In some embodiments, the energy storage device container 300 includes any other charge or energy storage or containment device. In some embodiments, the energy storage device container 300 is coupled to a controller (not shown, for example the EV controller) configured to monitor a charge state or a charge value of the energy storage device container 300. The controller may provide controls for how the energy storage device container 300 is charged or discharged and may provide various signals, interlocks, and so forth with respect to the energy storage device container 300. For example, the controller may limit charging of the energy storage device container 300 in certain weather conditions, vehicle conditions or states, or based on one or more interlocks (such as when a charging port door is left open, and so forth).

The energy storage device container 300 provides electrical energy to the at least one motor 304. The at least one motor 304 converts the electrical energy to mechanical energy to rotate one or more of the plurality of wheels 306, thus causing the vehicle 350 to move. In some embodiments, the at least one motor 304 is coupled to two or more of the plurality of wheels 306. In some embodiments, the at least one motor 304 includes two motors 304 that each power a single wheel 306 of the plurality of wheels 306. In some embodiments, the controller monitors the state of the at least one motor 304, for example whether the at least one motor 304 is driving at least one of the plurality of wheels 306 to cause the vehicle 350 to move based on energy from the energy storage device container 300, and so forth. In some embodiments, the controller may monitor a direction in which the at least one wheel 306 is rotating.

The vehicle 350 may be configured to use the wheel(s) 306, the motor(s) 304, and the energy storage device container 300 to charge the energy storage devices within the container 300 using an energy generation system such as regenerative braking from a generative braking system. Regenerative braking enables the vehicle 350 to capture energy from the rotation of the wheel(s) 306 for storage in the energy storage device container 300 when the vehicle 350 is coasting (for example, moving with using energy from the energy storage device container 300 to power the motor(s) 304 to drive the wheel(s) 306) and/or braking. Regenerative braking effectively charges the vehicle 350 based on kinetic energy of the vehicle 350. Effectively, the motor(s) 304 convert the kinetic energy from the moving vehicle 350 to electrical energy for storage in the energy storage device container 300, causing the vehicle 350 to slow. In some embodiments, the controller may be used to control operation of the motor(s) 304 efficiently and effectively to enable regenerative braking when the motor(s) 304 is not being used to drive the wheel(s). For example, the controller may determine that the motor 304 is not being used to drive the corresponding wheel 306 and may switch the motor 304 into a regenerative braking mode or state to capture charge from the movement of the vehicle 350. In some embodiments, if the controller determines that at least one wheel 306 is rotating at a speed faster than a speed at which it is being driving (for example, when the vehicle 350 is going down a steep hill), then the controller controls the motor 304 to perform regenerative braking or otherwise regenerate charge from the movement of the vehicle 350. In some embodiments, the controller generates one or more alerts for display to a driver or operator of the vehicle 350 or communicated to an internal or external system (for example, about charging needs, battery levels, regenerative braking, and so forth).

The vehicle 350 may include a charging port that allows the energy storage device container 300 to be connected to a power source for charging. Often, the charging port allows connection of a plug external to the vehicle 350 that is then connected to an external power source, such as a wall charger, and so forth. In some embodiments, internal wiring couples the charging port to the energy storage device container 300 to allow for charging. Alternatively, or additionally, the vehicle 350 includes a wireless power antenna configured to receive and/or transmit power wirelessly. As such, internal wiring couples the wireless power antenna to the energy storage device container 300 to allow for charging. In some embodiments, the internal wiring may couple either the charging port and/or the wireless power antenna directly to the motor 304. The controller may detect when the energy storage device container 300 is receiving a charge via the charging port and/or the wireless power antenna.

An energy storage device container, as shown and or described herein may be incorporated into any device or system that requires energy storage and/or usage such as electric vehicles for transportation (for example, cars, trucks, tractor trailers, motorcycles, scooters, trains, boats, aircraft), electric equipment for construction or farming (for example, tractors, bulldozers, lawnmowers), power tools (for example, blowers, drills, lawnmowers, nail guns, saws), building energy/power systems, manufacturing energy/power systems, games, drones, robots, toys and the like.

ADDITIONAL IMPLEMENTATIONS

As used herein, "system," "instrument," "apparatus," and "device" generally encompass both the hardware (for example, mechanical and electronic) and, in some implementations, associated software (for example, specialized computer programs for graphics control) components.

It is to be understood that not necessarily all objects or advantages may be achieved in accordance with any particular embodiment described herein. Thus, for example, those skilled in the art will recognize that certain implementations may be configured to operate in a manner that achieves or optimizes one advantage or group of advantages as taught herein without necessarily achieving other objects or advantages as may be taught or suggested herein.

Each of the processes, methods, and algorithms described in the preceding sections may be embodied in, and fully or partially automated by, code modules executed by one or more computer systems or computer processors including computer hardware. The code modules may be stored on any type of non-transitory computer-readable medium or computer storage device, such as hard drives, solid state memory, optical disc, and/or the like. The systems and modules may also be transmitted as generated data signals (for example, as part of a carrier wave or other analog or digital propagated signal) on a variety of computer-readable transmission mediums, including wireless-based and wired/cable-based mediums, and may take a variety of forms (for example, as part of a single or multiplexed analog signal, or as multiple discrete digital packets or frames). The processes and algorithms may be implemented partially or wholly in application-specific circuitry. The results of the disclosed processes and process steps may be stored, persistently or otherwise, in any type of non-transitory computer storage such as, for example, volatile or non-volatile storage.

Many other variations than those described herein will be apparent from this disclosure. For example, depending on the embodiment, certain acts, events, or functions of any of the algorithms described herein can be performed in a different sequence, can be added, merged, or left out altogether (for example, not all described acts or events are necessary for the practice of the algorithms). Moreover, in certain implementations, acts or events can be performed concurrently, for example, through multi-threaded processing, interrupt processing, or multiple processors or processor cores or on other parallel architectures, rather than sequentially. In addition, different tasks or processes can be performed by different machines and/or computing systems that can function together.

The various illustrative logical blocks, modules, and algorithm elements described in connection with the implementations disclosed herein can be implemented as electronic hardware, computer software, or combinations of both. To clearly illustrate this interchangeability of hardware and software, various illustrative components, blocks, modules, and elements have been described herein generally in terms of their functionality. Whether such functionality is implemented as hardware or software depends upon the particular application and design constraints imposed on the overall system. The described functionality can be implemented in varying ways for each particular application, but such implementation decisions should not be interpreted as causing a departure from the scope of the disclosure.

The various features and processes described herein may be used independently of one another, or may be combined in various ways. All possible combinations and sub-combinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example implementations. The example systems and components described herein may be configured differently than described. For example, elements may be added to, removed from, or rearranged compared to the disclosed example implementations.

The various illustrative logical blocks and modules described in connection with the implementations disclosed herein can be implemented or performed by a machine, such as a general purpose processor, a digital signal processor ("DSP"), an application specific integrated circuit ("ASIC"), a field programmable gate array ("FPGA") or other programmable logic device, discrete gate or transistor logic, discrete hardware components, or any combination thereof designed to perform the functions described herein. A general purpose processor can be a microprocessor, but in the alternative, the processor can be a controller, microcontroller, or state machine, combinations of the same, or the like. A processor can include electrical circuitry configured to process computer-executable instructions. In another embodiment, a processor includes an FPGA or other programmable devices that performs logic operations without processing computer-executable instructions. A processor can also be implemented as a combination of computing devices, for example, a combination of a DSP and a microprocessor, a plurality of microprocessors, one or more microprocessors in conjunction with a DSP core, or any other such configuration. Although described herein primarily with respect to digital technology, a processor may also include primarily analog components. For example, some, or all, of the signal processing algorithms described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, or algorithm described in connection with the implementations disclosed herein can be embodied directly in hardware, in a software module stored in one or more memory devices and executed by one or more processors, or in a combination of the two. A software module can reside in RAM memory, flash memory, ROM memory, EPROM memory, EEPROM memory, registers, hard disk, a removable disk, a CD-ROM, or any other form of non-transitory computer-readable storage medium, media, or physical computer storage known in the art. An example storage medium can be coupled to the processor such that the processor can read information from, and write information to, the storage medium. In the alternative, the storage medium can be integral to the processor. The storage medium can be volatile or nonvolatile. The processor and the storage medium can reside in an ASIC. The ASIC can reside in a user terminal. In the alternative, the processor and the storage medium can reside as discrete components in a user terminal.

Conditional language, such as, among others, "can," "could," "might," or "may," unless specifically stated otherwise, or otherwise understood within the context as used, is generally intended to convey that certain implementations include, while other implementations do not include, certain features, elements and/or steps. Thus, such conditional language is not generally intended to imply that features, elements and/or steps are in any way required for one or more implementations or that one or more implementations necessarily include logic for deciding, with or without user input or prompting, whether these features, elements and/or steps are included or are to be performed in any particular embodiment.

Disjunctive language such as the phrase "at least one of X, Y, or Z," unless specifically stated otherwise, is otherwise understood with the context as used in general to present that an item, term, and so forth, may be either X, Y, or Z, or any combination thereof (for example, X, Y, and/or Z). Thus, such disjunctive language is not generally intended to, and should not, imply that certain implementations require at least one of X, at least one of Y, or at least one of Z to each be present.

Language of degree used herein, such as the terms "approximately," "about," "generally," and "substantially" as used herein represent a value, amount, or characteristic close to the stated value, amount, or characteristic that still performs a desired function or achieves a desired result. For example, the terms "approximately", "about", "generally," and "substantially" may refer to an amount that is within less than 10% of, within less than 5% of, within less than 1% of, within less than 0.1% of, and within less than 0.01% of the stated amount. As another example, in certain implementations, the terms "generally parallel" and "substantially parallel" refer to a value, amount, or characteristic that departs from exactly parallel by less than or equal to 10 degrees, 5 degrees, 3 degrees, or 1 degree. As another example, in certain implementations, the terms "generally perpendicular" and "substantially perpendicular" refer to a value, amount, or characteristic that departs from exactly perpendicular by less than or equal to 10 degrees, 5 degrees, 3 degrees, or 1 degree.

Any process descriptions, elements, or blocks in the flow diagrams described herein and/or depicted in the attached figures should be understood as potentially representing modules, segments, or portions of code which include one or more executable instructions for implementing specific logical functions or steps in the process. Alternate implementations are included within the scope of the implementations described herein in which elements or functions may be deleted, executed out of order from that shown or discussed, including substantially concurrently or in reverse order, depending on the functionality involved, as would be understood by those skilled in the art.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

All of the methods and processes described herein may be embodied in, and partially or fully automated via, software code modules executed by one or more general purpose computers. For example, the methods described herein may be performed by the computing system and/or any other suitable computing device. The methods may be executed on the computing devices in response to execution of software instructions or other executable code read from a tangible computer readable medium. A tangible computer readable medium is a data storage device that can store data that is readable by a computer system. Examples of computer readable mediums include read-only memory, random-access memory, other volatile or non-volatile memory devices, CD-ROMs, magnetic tape, flash drives, and optical data storage devices.

It should be emphasized that many variations and modifications may be made to the herein-described implementations, the elements of which are to be understood as being among other acceptable examples. All such modifications and variations are intended to be included herein within the scope of this disclosure. The section headings used herein are merely provided to enhance readability and are not intended to limit the scope of the implementations disclosed in a particular section to the features or elements disclosed in that section. The foregoing description details certain implementations. It will be appreciated, however, that no matter how detailed the foregoing appears in text, the systems and methods can be practiced in many ways. As is also stated herein, it should be noted that the use of particular terminology when describing certain features or aspects of the systems and methods should not be taken to imply that the terminology is being re-defined herein to be restricted to including any specific characteristics of the features or aspects of the systems and methods with which that terminology is associated.

Those of skill in the art would understand that information, messages, and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

What is claimed is:

1. An energy storage device container for suppressing fires, the energy storage device container comprising:
   a compartment comprising a compartment material, the compartment being configured to receive an energy storage device;
   a chamber configured to hold a fire suppressive agent, the chamber being positioned above the compartment; and
   a barrier comprising a barrier material, the barrier being positioned between the compartment and the chamber and configured to physically separate the chamber from the compartment to inhibit the fire suppressive agent from entering the compartment when the barrier is in a first physical state,
   wherein the barrier is configured to change from the first physical state to a second physical state in response to thermal energy having a threshold temperature to allow the fire suppressive agent to enter the compartment to contact the energy storage device,
wherein the barrier is separated from the energy storage device by a distance without another material positioned between the barrier and the energy storage device to allow the fire suppressive agent to dissipate as it travels across the distance and contact a greater portion of the energy storage device,
wherein a melting temperature of the barrier material is less than a melting temperature of the compartment material, and
wherein the threshold temperature is less than the melting temperature of the compartment material.

2. The energy storage device container of claim 1 wherein an ignition temperature of the barrier material is less than the melting temperature of the compartment material.

3. The energy storage device container of claim 1 wherein an ignition temperature of the barrier material is less than an ignition temperature of the compartment material.

4. The energy storage device container of claim 1 wherein the melting temperature of the barrier material is less than an ignition temperature of the compartment material.

5. The energy storage device container of claim 1 wherein the melting temperature of the barrier material is less than an ignition temperature of the barrier material.

6. The energy storage device container of claim 1 wherein the barrier has a thickness of less than 2 inches.

7. The energy storage device container of claim 1 wherein the barrier comprises a plurality of materials.

8. The energy storage device container of claim 1 wherein the chamber is pressurized relative to the compartment when the barrier is in the first physical state.

9. The energy storage device container of claim 1 wherein the chamber is not pressurized relative to the compartment when the barrier is in the first physical state, wherein the fire suppressive material enters the compartment in response to gravity when the barrier is in the second physical state.

10. The energy storage device container of claim 1 wherein the distance is greater than a thickness of the barrier.

11. The energy storage device container of claim 1 wherein the compartment material comprises aluminum or an aluminum alloy.

12. The energy storage device container of claim 1 wherein the energy storage device container is implemented in an electric vehicle.

13. An energy storage device container for suppressing fires, the energy storage device container comprising:
a compartment comprising a compartment material, the compartment being configured to receive an energy storage device;
a chamber configured to hold a fire suppressive agent, the chamber being positioned above the compartment; and
a barrier comprising a barrier material, the barrier being disposed between the compartment and the chamber and configured to physically separate the chamber from the compartment to inhibit the fire suppressive agent from entering the compartment when the barrier is in a first physical state,
wherein the barrier is configured to change from the first physical state to a second physical state in response to thermal energy having a threshold temperature to allow the fire suppressive agent to enter the compartment to contact the energy storage device,
wherein the barrier is separated from the energy storage device by a distance without another material positioned between the barrier and the energy storage device to allow the fire suppressive agent to dissipate as it travels across the distance and contact a greater portion of the energy storage device,
wherein an ignition temperature of the barrier material is less than an ignition temperature of compartment material, and
wherein the threshold temperature is less than the ignition temperature of the compartment material.

14. The energy storage device container of claim 13 wherein the ignition temperature of the barrier material is less than a melting temperature of the compartment material.

15. The energy storage device container of claim 13 wherein a melting temperature of the barrier material is less than a melting temperature of the compartment material and is less than the ignition temperature of the compartment material.

16. The energy storage device container of claim 13 wherein a melting temperature of the barrier material is less than the ignition temperature of the barrier material.

17. The energy storage device container of claim 13 wherein a pressure within the chamber is substantially similar to a pressure within the compartment when the barrier is in the first physical state.

18. The energy storage device container of claim 13 wherein the distance is greater than a thickness of the barrier.

19. A container for holding an energy storage device, the container comprising:
a compartment configured to receive an energy storage device;
a chamber configured to hold a fire suppressive agent, the chamber being positioned above the compartment; and
a barrier disposed between the compartment and the chamber, the barrier being configured to physically separate the chamber from the compartment to inhibit the fire suppressive agent from entering the compartment,
wherein a structure of the barrier is configured to change responsive to thermal energy to allow the fire suppressive agent to enter the compartment,
wherein a structure of the compartment is more resistant to change, responsive to the thermal energy, than the structure of the barrier, and
wherein the barrier is separated from the energy storage device by a distance without another material positioned between the barrier and the energy storage device to allow the fire suppressive agent to dissipate as it travels across the distance and contact a greater portion of the energy storage device.

20. The container of claim 19 wherein the barrier is configured to ignite responsive to the thermal energy before the compartment.

21. The container of claim 19 wherein the barrier is configured to melt responsive to the thermal energy before the compartment.

22. The container of claim 19 wherein the barrier is configured to melt before igniting.

23. The container of claim 19 wherein the distance is greater than a thickness of the barrier.

* * * * *